(12) United States Patent
Lee et al.

(10) Patent No.: US 11,674,011 B2
(45) Date of Patent: Jun. 13, 2023

(54) CROSS-LINKED POLYOLEFIN SEPARATOR AND MANUFACTURING METHOD THEREOF

(71) Applicant: LG Chem, Ltd., Seoul (KR)

(72) Inventors: Joo-Sung Lee, Daejeon (KR); Won-Sik Bae, Daejeon (KR); Bi-Oh Ryu, Daejeon (KR)

(73) Assignee: LG Chem, Ltd.

( * ) Notice: Subject to any disclaimer, the term of this patent is extended or adjusted under 35 U.S.C. 154(b) by 643 days.

(21) Appl. No.: 16/766,829

(22) PCT Filed: Aug. 30, 2019

(86) PCT No.: PCT/KR2019/011219
§ 371 (c)(1),
(2) Date: May 26, 2020

(87) PCT Pub. No.: WO2020/046075
PCT Pub. Date: Mar. 5, 2020

(65) Prior Publication Data
US 2021/0017351 A1    Jan. 21, 2021

(30) Foreign Application Priority Data

Aug. 31, 2018 (KR) .................. 10-2018-0103770
Nov. 19, 2018 (KR) .................. 10-2018-0142938

(51) Int. Cl.
| | | |
|---|---|---|
| *C08J 9/26* | (2006.01) | |
| *B29C 48/00* | (2019.01) | |
| *B29C 48/08* | (2019.01) | |
| *B29C 48/91* | (2019.01) | |
| *H01M 50/446* | (2021.01) | |
| *B29C 55/00* | (2006.01) | |
| *B29C 55/12* | (2006.01) | |
| *C08J 9/36* | (2006.01) | |
| *C08L 23/06* | (2006.01) | |
| *C08L 51/00* | (2006.01) | |
| *H01M 10/0525* | (2010.01) | |
| *H01M 50/443* | (2021.01) | |
| *B29K 23/00* | (2006.01) | |
| *B29L 31/34* | (2006.01) | |

(52) U.S. Cl.
CPC ............ *C08J 9/26* (2013.01); *B29C 48/0018* (2019.02); *B29C 48/022* (2019.02); *B29C 48/08* (2019.02); *B29C 48/91* (2019.02); *B29C 55/005* (2013.01); *B29C 55/12* (2013.01); *C08J 9/365* (2013.01); *C08L 23/06* (2013.01); *C08L 51/003* (2013.01); *H01M 10/0525* (2013.01); *H01M 50/443* (2021.01); *H01M 50/446* (2021.01); *B29K 2023/065* (2013.01); *B29L 2031/3468* (2013.01); *C08J 2201/042* (2013.01); *C08J 2323/06* (2013.01); *C08J 2351/08* (2013.01); *C08J 2423/06* (2013.01); *C08J 2451/08* (2013.01); *C08L 2203/20* (2013.01); *C08L 2312/08* (2013.01)

(58) Field of Classification Search
CPC ........ C08J 2201/042; C08J 9/26; C08J 9/365; C08J 2451/08; C08J 2351/08; C08J 2351/06; C08J 5/2243; B29L 2031/3468; H01M 50/443; H01M 50/446; H01M 50/403; H01M 10/0525; B29C 55/005; B29C 48/0228; B29C 48/08; B29C 48/91; B29C 48/0018; C08L 2312/08
See application file for complete search history.

(56) References Cited

U.S. PATENT DOCUMENTS

| | | | |
|---|---|---|---|
| 9,331,323 B2 | 5/2016 | Huang | |
| 2003/0031924 A1 | 2/2003 | Lee et al. | |
| 2005/0084727 A1 | 4/2005 | Kiefer et al. | |
| 2007/0190303 A1 | 8/2007 | Lee et al. | |
| 2010/0098997 A1 | 4/2010 | Ohgi et al. | |
| 2014/0315065 A1 | 10/2014 | Mizuno et al. | |
| 2016/0126518 A1* | 5/2016 | Park ................... | H01M 50/406 521/143 |
| 2016/0141574 A1 | 5/2016 | Ryu et al. | |
| 2017/0125832 A1 | 5/2017 | Umeda et al. | |
| 2018/0294458 A1 | 10/2018 | Ko et al. | |

FOREIGN PATENT DOCUMENTS

| | | |
|---|---|---|
| CN | 101309953 A | 11/2008 |
| CN | 101589496 A | 11/2009 |
| CN | 101724170 A | 6/2010 |
| CN | 104823304 A | 8/2015 |
| CN | 105393383 A | 3/2016 |

(Continued)

OTHER PUBLICATIONS

International Search Report from Application No. PCT/KR2019/011219 dated Dec. 27, 2019, 2 pages.

(Continued)

*Primary Examiner* — Christopher M Rodd
(74) *Attorney, Agent, or Firm* — Lerner David LLP

(57) ABSTRACT

A method for manufacturing a crosslinked polyolefin separator and the crosslinked polyolefin separator obtained therefrom are provided. The method includes non-grafted polyolefin having a weight average molecular weight of 300,000 or more and silane-grafted polyolefin having a weight average molecular weight of 300,000 or more. The method minimizes gel formation, a side reaction occurring in an extruder during the manufacture of the separator, and provides the separator having a uniform surface.

19 Claims, No Drawings

(56) References Cited

FOREIGN PATENT DOCUMENTS

| | | | |
|---|---|---|---|
| CN | 105576172 | A | 5/2016 |
| JP | H09216964 | A | 8/1997 |
| JP | 2001176484 | A | 6/2001 |
| JP | 2001200081 | A | 7/2001 |
| JP | 2001200082 | A | 7/2001 |
| JP | 2003519723 | A | 6/2003 |
| JP | 3735150 | B2 | 1/2006 |
| KR | 19990049313 | A | 7/1999 |
| KR | 100862868 | B1 | 10/2008 |
| KR | 20100065402 | A | 6/2010 |
| KR | 20130073182 | A | 7/2013 |
| KR | 20140081779 | A | 7/2014 |
| KR | 20160128725 | A | 11/2016 |
| KR | 20160129580 | A | 11/2016 |
| KR | 20160142289 | A | 12/2016 |
| KR | 20160146134 | A | 12/2016 |
| KR | 20180033487 | A | 4/2018 |

OTHER PUBLICATIONS

Extended European Search Report including Written Opinion for Application No. 19853504.9 dated Apr. 8, 2021, pp. 1-9.
Rahman W. A., "Design of Silane Crosslinkable High Density Polyethylene Compounds for Automotive Fuel Tank Application", Faculty of Chemical and Natural Resource Engineering, Jan. 2006, pp. 1-219, Malaysia.
Search Report dated Mar. 23, 2022 from Office Action for Chinese Application No. 201980006107.8 dated Apr. 1, 2022. 3 pgs.

\* cited by examiner

CROSS-LINKED POLYOLEFIN SEPARATOR AND MANUFACTURING METHOD THEREOF

CROSS-REFERENCE TO RELATED APPLICATIONS

The present application is a national phase entry under 35 U.S.C. § 371 of International Application No. PCT/KR2019/011219 filed Aug. 30, 2019 which claims priority from Korean Patent Application No. 10-2018-0103770 filed on Aug. 31, 2018 and Korean Patent Application No. 10-2018-0142938 filed on Nov. 19, 2018 in the Republic of Korea, the disclosures of which are incorporated herein by reference in their entirety.

TECHNICAL FIELD

The present disclosure relates to a crosslinked polyolefin separator and a method for manufacturing the same.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Such a lithium secondary battery includes a positive electrode, a negative electrode, an electrolyte and a separator. Particularly, it is required for the separator to have insulation property for separating the positive electrode and the negative electrode from each other and high ion conductivity for increasing lithium ion permeability based on high porosity.

In addition, it is required for the separator to have a broad interval between a shutdown temperature and a meltdown temperature so that a lithium secondary battery including the separator may ensure safety. To broaden the interval between a shutdown temperature and a meltdown temperature, it is required that the shutdown temperature is controlled to be decreased and the meltdown temperature is controlled to be increased.

As a method for increasing the meltdown temperature, there is use of a crosslinked polyolefin porous membrane.

Meanwhile, such a crosslinked polyolefin porous membrane may be prepared by using silane-grafted (modified) polyolefin having a low weight average molecular weight. In this case, it is difficult to control the temperature of an extruder to a high temperature. Moreover, there is a problem in that processability may be degraded due to high gel content in the extruder.

DISCLOSURE

Technical Problem

The present disclosure is designed to solve the problems of the related art, and therefore the present disclosure is directed to providing a method for manufacturing a cross-linked polyolefin separator which shows improved processability by controlling the temperature of an extruder to a high temperature and reducing the gel content in the extruder, and a separator obtained by the method.

The present disclosure is also directed to providing a crosslinked polyolefin separator which has a uniform separator surface and causes no die-drool phenomenon, and a method for manufacturing the same.

Technical Solution

According to the first embodiment of the present disclosure, there is provided a method for manufacturing a crosslinked polyolefin separator, including the steps of:

(S1) introducing non-grafted polyolefin having a weight average molecular weight of 300,000 or more, silane-grafted polyolefin having a weight average molecular weight of 300,000 or more, a diluting agent, an initiator, an alkoxysilane compound containing a carbon-carbon double bonded group and a crosslinking catalyst to an extruder, followed by mixing, and then carrying out reactive extrusion at 200° C. or higher to obtain a silane-grafted polyolefin composition;

(S2) molding and orienting the reactive extruded silane-grafted polyolefin composition in the form of a sheet;

(S3) extracting the diluting agent from the oriented sheet to obtain a porous membrane;

(S4) thermally fixing the porous membrane; and (S5) crosslinking the porous membrane in the presence of water, wherein the content of alkoxysilane compound containing a carbon-carbon double bonded group is 0.01-2 parts by weight based on 100 parts by weight of the total weight of the non-grafted polyolefin, silane-grafted polyolefin and the diluent.

According to the second embodiment of the present disclosure, there is provided the method for manufacturing a crosslinked polyolefin separator as defined in the first embodiment, wherein the weight ratio of the non-grafted polyolefin to the silane-grafted polyolefin is 90:10-20:80.

According to the third embodiment of the present disclosure, there is provided the method for manufacturing a crosslinked polyolefin separator as defined in the first or the second embodiment, wherein the non-grafted polyolefin has a weight average molecular weight of 300,000-1,500,000.

According to the fourth embodiment of the present disclosure, there is provided the method for manufacturing a crosslinked polyolefin separator as defined in any one of the first to the third embodiments, wherein the silane-grafted polyolefin has a weight average molecular weight of 300,000-1,000,000.

According to the fifth embodiment of the present disclosure, there is provided the method for manufacturing a crosslinked polyolefin separator as defined in any one of the first to the fourth embodiments, wherein the reactive extrusion is carried out at a temperature of 200-250° C.

According to the sixth embodiment of the present disclosure, there is provided the method for manufacturing a crosslinked polyolefin separator as defined in any one of the first to the fifth embodiments, wherein the alkoxysilane compound containing a carbon-carbon double bonded group includes vinyltrimethoxysilane, vinyltriethoxysilane, vinyltriacetoxysilane, (3-methacryloxypropyl)trimethoxysilane, (3-methacryloxypropyl) triethoxysilane, vinylmethyl dimethoxysilane, vinyl-tris(2-methoxyethoxy)silane, vinylmethyldiethoxysilane or a mixture of at least two of them.

According to the seventh embodiment of the present disclosure, there is provided the method for manufacturing a crosslinked polyolefin separator as defined in any one of the first to the sixth embodiments, wherein the content of the alkoxysilane compound containing a carbon-carbon double bonded group is 0.05-1.2 parts by weight based on 100 parts by weight of the total weight of the non-grafted polyolefin, silane-grafted polyolefin and the diluting agent.

According to the eighth embodiment of the present disclosure, there is provided the method for manufacturing a crosslinked polyolefin separator as defined in any one of the first to the seventh embodiments, wherein the non-grafted polyolefin has a weight average molecular weight of 300,000-1,000,000, the silane-grafted polyolefin has a weight average molecular weight of 300,000-1,000,000, the weight ratio of the non-grafted polyolefin to the silane-grafted polyolefin is 90:10-50:50, the reactive extrusion is carried out at a temperature of 200-230° C., and the content of the alkoxysilane compound containing a carbon-carbon double bonded group is 0.1-0.5 parts by weight based on 100 parts by weight of the total weight of the non-grafted polyolefin, silane-grafted polyolefin and the diluting agent.

According to the ninth embodiment of the present disclosure, there is provided the method for manufacturing a crosslinked polyolefin separator as defined in any one of the first to the eighth embodiments, wherein the thermal fixing is carried out at a temperature of 100-230° C.

According to the tenth embodiment of the present disclosure, there is provided the method for manufacturing a crosslinked polyolefin separator as defined in any one of the first to the ninth embodiments, which further includes a step of applying and drying slurry for forming a porous coating layer including inorganic particles, a binder polymer and a solvent, after step (S5).

According to the eleventh embodiment of the present disclosure, there is provided the method for manufacturing a crosslinked polyolefin separator as defined in any one of the first to the tenth embodiments, wherein a phosphorus compound containing a carbon-carbon double bonded group is further introduced to the extruder in step (S1).

According to the twelfth embodiment of the present disclosure, there is provided the method for manufacturing a crosslinked polyolefin separator as defined the eleventh embodiment, wherein step (S1) includes introducing non-grafted polyolefin having a weight average molecular weight of 300,000 or more, silane-grafted polyolefin having a weight average molecular weight of 300,000 or more, a diluting agent, an initiator, alkoxy group-containing vinylsilane, a phosphorus compound containing a carbon-carbon double bonded group and a crosslinking catalyst to an extruder, followed by mixing, and then carrying out reactive extrusion at 200° C. or higher to obtain a polyolefin composition having the silane compound and phosphorus compound grafted to the backbone of polyolefin.

According to the thirteenth embodiment of the present disclosure, there is provided the method for manufacturing a crosslinked polyolefin separator as defined in the eleventh or the twelfth embodiment, wherein the phosphorus compound containing a carbon-carbon double bonded group includes diphenylvinylphosphine oxide, diphenylvinylphosphine, dimethylvinyl phosphonate, diethylvinyl phosphonate, diphenylvinyl phosphate, dimethylvinyl phosphate, diethylvinyl phosphate, ethenyl dihydrogen phosphate, isopropenyl dihydrogen phosphate, vinylphosphonic acid or a mixture of at least two of them.

According to the fourteenth embodiment of the present disclosure, there is provided the method for manufacturing a crosslinked polyolefin separator as defined in any one of the eleventh to the thirteenth embodiments, wherein the total content of the alkoxysilane compound containing a carbon-carbon double bonded group and the phosphorus compound containing a carbon-carbon double bonded group is 0.01-2 parts by weight based on 100 parts by weight of the total weight of the non-grafted polyolefin, silane-grafted polyolefin and the diluting agent.

According to the fifteenth embodiment of the present disclosure, there is provided the method for manufacturing a crosslinked polyolefin separator as defined in any one of the eleventh to the fourteenth embodiments, wherein the weight ratio of the alkoxysilane compound containing a carbon-carbon double bonded group to the phosphorus compound containing a carbon-carbon double bonded group is 90:10-30:70.

According to the sixteenth embodiment of the present disclosure, there is provided the method for manufacturing a crosslinked polyolefin separator as defined in any one of the eleventh to the fifteenth embodiments, wherein the separator has a shutdown temperature of 135° C. or lower and a meltdown temperature of 185° C. or higher.

According to the seventeenth embodiment of the present disclosure, there is provided the method for manufacturing a crosslinked polyolefin separator as defined in any one of the eleventh to the sixteenth embodiments, wherein the separator shows a difference between the shutdown temperature and meltdown temperature of 30° C. or higher.

In another aspect of the present disclosure, there is provided a crosslinked polyolefin separator obtained by the method as defined in any one of the eleventh to the seventeenth embodiments, which includes a silane compound and phosphorus compound grafted to the backbone of polyolefin, and has a silane-derived crosslinking structure.

In still another aspect of the present disclosure, there is provided a crosslinked polyolefin separator obtained by the method as defined in any one of the first to the tenth embodiments.

Advantageous Effects

In the method for manufacturing a crosslinked polyolefin separator according to an embodiment of the present disclosure, polyolefin having a high weight average molecular weight and silane-grafted polyolefin having a high weight average molecular weight are used at the same time. Thus, it is possible to carry out reactive extrusion at a higher temperature. Therefore, it is possible to improve the compatibility of polyolefin with the diluting agent, and thus to provide a separator having a uniform surface.

In addition, in the method for manufacturing a crosslinked polyolefin separator according to an embodiment of the present disclosure, the content of alkoxy group-containing vinylsilane is controlled to reduce the gel content in an extruder, thereby providing improved processability.

Best Mode

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As used herein, the expression 'one portion is connected to another portion' covers not only 'a portion is directly connected to another portion' but also 'one portion is connected electrically to another portion' by way of the other element interposed between them.

Throughout the specification, the expression 'a part [includes] an element' does not preclude the presence of any additional elements but means that the part may further include the other elements.

In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination(s) thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

In one aspect of the present disclosure, there are provided a method for manufacturing a crosslinked polyolefin separator and a crosslinked polyolefin separator obtained thereby.

A separator used for a lithium secondary battery shows excellent safety, when it has a large difference between the shutdown temperature and meltdown temperature. Herein, in order to broaden the interval between them, it is required that the shutdown temperature is controlled to be decreased and the meltdown temperature is controlled to be increased.

Therefore, the present inventors used a crosslinked polyolefin porous membrane in order to obtain a separator having a higher meltdown temperature. Such a crosslinked polyolefin porous membrane may be obtained by using silane-grafted polyolefin itself. When the crosslinked polyolefin porous membrane is obtained by using silane-grafted (modified) polyolefin having a low weight average molecular weight alone according to the related art, a side effect of increasing the gel content in an extruder is generated and it is difficult to control the extrusion temperature to a high temperature, resulting in degradation of the compatibility of polyolefin with a diluting agent and production of a separator having a non-uniform surface.

Meanwhile, when using non-grafted polyolefin alone, it is required to introduce an excessive amount of alkoxysilane compound containing a carbon-carbon double bonded group in order to prepare a predetermined amount of silane-grafted polyolefin. Herein, a part of alkoxysilane compound containing a carbon-carbon double bonded group does not react with non-grafted polyolefin, and the remaining alkoxysilane compound containing a carbon-carbon double bonded group has high volatility to cause a problem of die-drool formation in a T-die. In other words, there is a problem in that vinylsilane monomer having high volatility does not react with polyolefin through silane grafting but forms die-drool in a T-die in its unreacted state. In addition, the initiator introduced to an extruder may cause a side reaction, such as C—C crosslinking between polymer chains.

The inventors of the present disclosure have conducted intensive studies to solve the above-mentioned problems. The present disclosure is directed to providing a method for manufacturing a separator having a uniform surface. According to the present disclosure, the method uses non-grafted polyolefin having a controlled weight average molecular weight and silane-grafted polyolefin having a controlled weight average molecular weight, controls the content of an alkoxysilane compound containing a carbon-carbon double bonded group and controls the temperature during reactive extrusion so that gel formation in the extruder may be minimized during the manufacture of a separator and the processability may be improved. The present disclosure is also directed to providing a crosslinked polyolefin separator obtained by the above-mentioned method.

In one aspect of the present disclosure, there is provided a method for manufacturing a crosslinked polyolefin separator, including the steps of:

(S1) introducing non-grafted polyolefin having a weight average molecular weight of 300,000 or more, silane-grafted polyolefin having a weight average molecular weight of 300,000 or more, a diluting agent, an initiator, an alkoxysilane compound containing a carbon-carbon double bonded group and a crosslinking catalyst to an extruder, followed by mixing, and then carrying out reactive extrusion at 200° C. or higher to obtain a silane-grafted polyolefin composition;

(S2) molding and orienting the reactive extruded silane-grafted polyolefin composition in the form of a sheet;

(S3) extracting the diluting agent from the oriented sheet to obtain a porous membrane;

(S4) thermally fixing the porous membrane; and (S5) crosslinking the porous membrane in the presence of water, wherein the content of alkoxysilane compound containing a carbon-carbon double bonded group is 0.01-2 parts by weight based on 100 parts by weight of the total weight of the non-grafted polyolefin, silane-grafted polyolefin and the diluent.

Even though the process according to the related art uses non-grafted polyolefin in combination with silane-grafted polyolefin, there was no consideration about the weight average molecular weight of each polyolefin and the content of alkoxy group-containing vinylsilane.

However, according to the present disclosure, the weight average molecular weight of non-grafted polyolefin, weight average molecular weight of silane-grafted polyolefin and the content of alkoxysilane compound containing a carbon-carbon double bonded group are controlled, while controlling the reactive extrusion temperature. In this manner, it is possible to reduce the gel content in an extruder, to prevent a die-drool phenomenon and to provide a separator having a uniform surface.

Hereinafter, the method for manufacturing a crosslinked polyolefin separator according to the present disclosure will be explained in detail.

First, non-grafted polyolefin having a weight average molecular weight of 300,000 or more, silane-grafted polyolefin having a weight average molecular weight of 300,000 or more, a diluting agent, an initiator, an alkoxysilane compound containing a carbon-carbon double bonded group and a crosslinking catalyst are introduced to and mixed in an extruder, and then reactive extrusion is carried out at 200° C. or higher to obtain a silane-grafted polyolefin composition (S1).

The non-grafted polyolefin has a weight average molecular weight of 300,000 or more.

According to an embodiment of the present disclosure, the non-grafted polyolefin may have a weight average molecular weight of 300,000-1,500,000 or 300,000-1,000,000.

According to the present disclosure, it is possible to obtain a separator having excellent strength and heat resistance, while ensuring uniformity and film-forming processability, by using non-grafted polyolefin having the above-defined range of molecular weight.

The silane-grafted polyolefin has a weight average molecular weight of 300,000 or more.

According to an embodiment of the present disclosure, the silane-grafted polyolefin may have a weight average molecular weight of 300,000-1,000,000 or 300,000-800,000.

As used herein, 'weight average molecular weight' may refer to a value converted based on standard polystyrene determined by gel permeation chromatography (GPC). Unless otherwise stated, 'molecular weight' may refer to weight average molecular weight.

According to the present disclosure, non-grafted polyolefin and silane-grafted polyolefin are used at the same time, with the proviso that the silane-grafted polyolefin has a weight average molecular weight of 300,000 or more. Thus, as described hereinafter, reactive extrusion may be carried out at a high temperature of 200° C. or higher. When, silane-grafted polyolefin having a low molecular weight, such as a molecular weight of 200,000 or less, is used, a die-drool phenomenon may occur and the appearance of a T-die sheet may be non-uniform due to such a short polymer chain.

On the contrary, according to the present disclosure, silane-grafted polyolefin having a high weight average molecular weight of 300,000 or more is used so that the alkoxy group-containing vinylsilane may have reduced volatility. Therefore, it is possible to inhibit a die-drool phenomenon occurring in a T-die.

According to an embodiment of the present disclosure, the non-grafted polyolefin may be polyethylene; polypropylene; polybutylene; polypentene; polyhexene; polyoctene; a copolymer of at least two of ethylene, propylene, butene, pentene, 4-methylpentene, hexane, heptane and octene; or a mixture thereof.

Particularly, polyethylene includes low-density polyethylene (LDPE), linear low-density polyethylene (LLDPE), high-density polyethylene (HDPE), or the like. Among those, high-density polyethylene having a high crystallization degree and a high resin melting point is most preferred.

According to an embodiment of the present disclosure, the silane-grafted polyolefin may be polyethylene; polypropylene; polybutylene; polypentene; polyhexene; polyoctene; a copolymer of at least two of ethylene, propylene, butene, pentene, 4-methylpentene, hexane, heptane and octene; or a mixture thereof.

Particularly, polyethylene includes low-density polyethylene (LDPE), linear low-density polyethylene (LLDPE), high-density polyethylene (HDPE), or the like. Among those, high-density polyethylene having a high crystallization degree and a high resin melting point is most preferred.

According to an embodiment of the present disclosure, the weight ratio of the non-grafted polyolefin to the silane-grafted polyolefin may be 90:10-20:80, 90:10-30:70, 90:10-40:60, or 90:10-50:50. When the content of the non-grafted polyolefin is 90% or less, it is not required to introduce a relatively larger amount of crosslinking additives (alkoxysilane compound containing a carbon-carbon double bonded group, initiator, crosslinking catalyst, etc.) for silane grafting, and thus it is possible to reduce the side reactions other than silane grafting. For example, it is possible to inhibit a die-drool phenomenon caused by evaporation of the alkoxysilane compound containing a carbon-carbon double bonded group, carbon-carbon crosslinking caused by the initiator, or the like. Meanwhile, when the content of the silane-grafted polyolefin is 80% or less, silane grafting ratio is relatively low so that crosslinking caused by water may hardly occur during orientation. Thus, it is possible to improve the orientation and film-forming processability.

According to an embodiment of the present disclosure, the diluting agent may include liquid or solid paraffin oil, mineral oil, wax, soybean oil, or the like, used currently for manufacturing a separator through a wet process.

According to an embodiment of the present disclosure, the diluting agent may be one capable of liquid-liquid phase separation against polyolefin. For example, the diluting agent may be a phthalic acid ester, such as dibutyl phthalate, dihexyl phthalate, dioctyl phthalate, or the like; aromatic ether, such as diphenyl ether, benzyl ether, or the like; C10-C20 fatty acid, such as palmitic acid, stearic acid, oleic acid, linolic acid, linoleic acid, or the like, C10-C20 fatty acid alcohol, such as palmitic acid alcohol, stearic acid alcohol, oleic acid alcohol, or the like; saturated or unsaturated fatty acid whose fatty acid group has 4-26 carbon atoms, such as palmitic acid mono-, di- or tri-ester, stearic acid mono-, di- or tri-ester, oleic acid mono-, di- or tri-ester, linoleic acid mono-, di- or tri-ester, or the like; or a fatty acid ester in which one or at least two fatty acids having an epoxy-substituted double bond of unsaturated fatty acid are ester-bound with a C1-C10 alcohol having 1-8 hydroxyl groups.

The diluting agent may include any one of the above-described ingredients or a mixture of at least two of them.

According to an embodiment of the present disclosure, the content of the diluting agent may be 100-350 parts by weight, 125-300 parts by weight, or 150-250 parts by weight, based on 100 parts by weight of the total weight of the non-grafted polyolefin and silane-grafted polyolefin.

When the total content of the diluting agent satisfies the above-defined range, it is possible to reduce the problems caused by an increase in polyolefin content, such as a decrease in porosity and pore size, reduced interconnection among pores and a significant decrease in permeability, an increase in viscosity of a polyolefin composition and extrusion load, and a difficulty in processing. It is also possible to reduce the problems caused by a decrease in polyolefin content, such as breakage upon orientation and non-uniform thickness, caused by a decrease in compatibility of polyolefin with a diluting agent and extrusion of polyolefin in the form of gel without thermodynamic blending of polyolefin with a diluting agent.

According to an embodiment of the present disclosure, the alkoxysilane compound containing a carbon-carbon double bonded group is a crosslinking agent inducing silane crosslinking, is grafted to polyolefin through vinyl groups, and functions to perform crosslinking of polyolefin through aqueous crosslinking caused by alkoxy groups.

According to an embodiment of the present disclosure, the alkoxysilane compound containing a carbon-carbon double bonded group may include a compound represented by the following Chemical Formula 1:

[Chemical Formula 1]

wherein each of $R_1$, $R_2$ and $R_3$ independently represents a C1-C10 alkoxy group or C1-C10 alkyl group, with the proviso that at least one of $R_1$, $R_2$ and $R_3$ represents an alkoxy group; and R represents a vinyl group, acryloxy group, methacryloxy group, or a C1-C20 alkyl group, wherein at least one hydrogen atom of the alkyl group is substituted with a vinyl group, acryloxy group, methacryloxy group, or methacryl group.

Meanwhile, R may further include an amino group, epoxy group or an isocyanate group.

According to an embodiment of the present disclosure, the alkoxysilane compound containing a carbon-carbon double bonded group may include vinyltrimethoxysilane, vinyltriethoxysilane, vinyltriacetoxysilane, (3-methacryloxypropyl)trimethoxysilane, (3-methacryloxypropyl)triethoxysilane, vinylmethyl dimethoxysilane, vinyl-tris(2-methoxyethoxy)silane, vinylmethyldiethoxysilane or a mixture of at least two of them.

According to an embodiment of the present disclosure, the content of the alkoxysilane compound containing a carbon-carbon double bonded group may be 0.01-2 parts by weight based on 100 parts by weight of the total weight of the non-grafted polyolefin, silane-grafted polyolefin and the diluting agent.

According to an embodiment of the present disclosure, the content of the alkoxysilane compound containing a carbon-carbon double bonded group may be 0.01-1 parts by weight, 0.05-0.7 parts by weight, or 0.1-0.5 parts by weight, based on 100 parts by weight of the total weight of the non-grafted polyolefin, silane-grafted polyolefin and the diluting agent. When the content of the alkoxysilane compound containing a carbon-carbon double bonded group satisfies the above-defined range, it is possible to prevent the problems of a decrease in crosslinking degree, caused by a low silane content and reduced graft ratio, and degradation of the appearance of an extruded sheet, caused by a high silane content and residue of unreacted silane. Meanwhile, it is possible to provide a method for manufacturing a crosslinked polyolefin separator with improved processability by controlling the content of the alkoxy group-containing vinylsilane to reduce the gel content in an extruder as mentioned above.

According to an embodiment of the present disclosure, the initiator may be any initiator, as long as it can generate radicals. Non-limiting examples of the initiator include 2,5-dimethyl-2,5-di(tert-butylperoxy)hexane (DHBP), benzoyl peroxide, acetyl peroxide, dilauryl peroxide, di-tert-butyl peroxide, dicumyl peroxide, cumyl peroxide, hydrogen peroxide, potassium persulfate, or the like.

According to an embodiment of the present disclosure, the content of the initiator may be 0.1-20 parts by weight, 0.5-10 parts by weight, or 1-5 parts by weight, based on 100 parts by weight of the alkoxysilane compound containing a carbon-carbon double bonded group. When the content of the initiator satisfies the above-defined range, it is possible to prevent the problems of a decrease in silane graft ratio, caused by a low content of initiator, and crosslinking between polyethylene molecules in an extruder, caused by a high content of initiator.

According to an embodiment of the present disclosure, the crosslinking catalyst is added to accelerate silane crosslinking.

According to an embodiment of the present disclosure, the crosslinking catalyst may be a carboxylate of metal, such as tin, zinc, iron, zinc or cobalt, organic base, inorganic acid or an organic acid. Non-limiting examples of the crosslinking catalyst include metal carboxylates, such as dibutyltin dilaurate, dibutyltin diacetate, stannous acetate, stannous capylate, zinc naphthenate, zinc caprylate and cobalt naphthenate, organic bases, such as ethylamine, dibutylamine, hexylamine and pyridine, inorganic acids, such as sulfuric acid and hydrochloric acid, and organic acids, such as toluene sulfonic acid, acetic acid, stearic acid and maleic acid. Such crosslinking catalyst may be used alone or in combination.

According to an embodiment of the present disclosure, the content of the crosslinking catalyst may be 0.1-5 parts by weight, 0.5-3 parts by weight, or 1-2 parts by weight, based on 100 parts by weight of the alkoxysilane compound containing a carbon-carbon double bonded group. When the content of the crosslinking catalyst satisfies the above-defined range, it is possible to carry out silane crosslinking to a desired level and to prevent undesired side reactions in a lithium secondary battery. In addition, there is no cost-related problem, such as waste of the catalyst.

According to an embodiment of the present disclosure, if necessary, the silane-grafted polyolefin composition may further include conventional additives for improving specific functions, such as an antioxidant, UV stabilizer, antistatic agent, nucleating agent, or the like.

According to the present disclosure, non-grafted polyolefin having a weight average molecular weight of 300,000 or more, silane-grafted polyolefin having a weight average molecular weight of 300,000 or more, a diluting agent, an initiator, an alkoxysilane compound containing a carbon-carbon double bonded group and a crosslinking catalyst are introduced to and mixed in an extruder, and then reactive extrusion is carried out at 200° C. or higher. Since such non-grafted polyolefin and silane-grafted polyolefin having a high weight average molecular weight are used at the same time according to the present disclosure, it is possible to carry out reactive extrusion at a higher temperature. As a result, it is possible to improve the compatibility of polyolefin with the diluting agent, to inhibit a die-drool phenomenon, and to provide a separator having a uniform surface.

According to an embodiment of the present disclosure, the reactive extrusion may be carried out at a temperature of 200-250° C., or 200-230° C.

According to an embodiment of the present disclosure, the reactive extrusion step may be carried out by using a uniaxial extruder or biaxial extruder.

Meanwhile, the inventors of the present disclosure have found that when a phosphorus compound containing a carbon-carbon double bonded group is further introduced to the extruder in step (S1), it is possible to provide a crosslinked polyolefin separator having a high meltdown temperature and a low shutdown temperature at the same time, and showing improved heat resistance as well as flame resistance.

Thus, according to an embodiment of the present disclosure, a phosphorus compound containing a carbon-carbon double bonded group may be further introduced to the extruder in step (S1).

Particularly, step (S1) includes introducing non-grafted polyolefin having a weight average molecular weight of 300,000 or more, silane-grafted polyolefin having a weight average molecular weight of 300,000 or more, a diluting agent, an initiator, an alkoxy group-containing vinylsilane, a phosphorus compound containing a carbon-carbon double bonded group and a crosslinking catalyst to an extruder, followed by mixing, and then carrying out reactive extrusion at 200° C. or higher to obtain a silane-grafted polyolefin composition including the silane compound and phosphorus compound grafted to the polyolefin backbone.

The phosphorus compound containing a carbon-carbon double bonded group is grafted to the polyolefin backbone through a carbon-carbon double bonded group. The grafted phosphorus compound containing a carbon-carbon double bonded group reduces the crystallinity of polyolefin, resulting in a decrease in melting temperature of polyolefin and a drop in shutdown temperature of a separator.

In other words, according to the present disclosure, it is possible to increase the meltdown temperature of a separator by introducing an alkoxysilane compound containing a carbon-carbon double bonded group, as well as to reduce the shutdown temperature and to enhance flame resistance by further introducing a phosphorus compound containing a carbon-carbon double bonded group.

On the contrary, when the phosphorus compound contains no carbon-carbon double bonded group, it is not possible to provide a sufficient effect of reducing the shutdown temperature.

For example, the phosphorus compound containing a carbon-carbon double bonded group may include diphenylvinylphosphine oxide, diphenylvinylphosphine, dimethyl vinyl phosphonate, diethyl vinyl phosphonate, diphenylvinyl phosphate, dimethylvinyl phosphate, diethylvinyl phosphate, ethenyl dihydrogen phosphate, isopropenyl dihydrogen phosphate, vinylphosphonic acid or a mixture of at least two of them.

According to and embodiment of the present disclosure, the total content of the alkoxysilane compound containing a carbon-carbon double bonded group and the phosphorus compound containing a carbon-carbon double bonded group may be 0.01-2 parts by weight, 0.1-1.8 parts by weight, or 0.3-1.5 parts by weight, based on 100 parts by weight of the total weight of the non-grafted polyolefin, silane-grafted polyolefin and the diluting agent. When the content of the alkoxysilane compound containing a carbon-carbon double bonded group and that of the phosphorus compound containing a carbon-carbon double bonded group satisfy the above-defined range, it is possible to prevent the problems of a decrease in crosslinking degree, caused by a low silane content and reduced graft ratio, and degradation of the appearance of an extruded sheet, caused by a high silane content and residue of unreacted silane. In addition, it is possible to obtain a flame retardant effect through the use of the phosphorus compound containing a carbon-carbon double bonded group. It is also possible to reduce the crystallinity of polyolefin and to reduce the shutdown temperature by virtue of adequate grafting to polyolefin.

According to an embodiment of the present disclosure, the weight ratio of the alkoxysilane compound containing a carbon-carbon double bonded group to the phosphorus compound containing a carbon-carbon double bonded group is 90:10-30:70, 80:20-40:60, or 70:30-50:50. When the weight ratio of the alkoxysilane compound containing a carbon-carbon double bonded group to the phosphorus compound containing a carbon-carbon double bonded group satisfies the above-defined range, the carbon-carbon double bonded groups in the alkoxysilane compound containing a carbon-carbon double bonded group and the phosphorus compound containing a carbon-carbon double bonded group provide grafting effects so that the crystallinity of polyolefin may be reduced, and the presence of the phosphorus compound provides a flame retardant effect at the same time.

In the case of a separator to which the phosphorus compound containing a carbon-carbon double bonded group is further introduced, it has a shutdown temperature of 133° C. or lower and a meltdown temperature of 175° C. or higher. According to an embodiment of the present disclosure, the separator may have a difference between the shutdown temperature and meltdown temperature of 30° C. or higher, or 40° C. or higher. In addition, according to an embodiment of the present disclosure, the separator may have a limited oxygen index (LOI) of 20-30. The separator according to an embodiment of the present disclosure has a higher limited oxygen index as compared to a polyolefin substrate alone (17.4), and thus can ensure higher safety in a battery cell.

As used herein, the term 'limited oxygen index (LOI)' is an abbreviation known to those skilled in the art, is an index for evaluating the combustibility and flame resistance of a polymer material, and indicates the minimum amount of oxygen required for a material to last combustion. It can be determined by using the test method of ASTM D 2863 in general.

Meanwhile, in another aspect of the present disclosure, there is provided a crosslinked polyolefin separator obtained by the method which includes further introducing a phosphorus compound containing a carbon-carbon double bonded group. The separator includes the silane compound and phosphorus compound grafted to the backbone of polyolefin, and has a silane-derived crosslinking structure.

According to an embodiment of the present disclosure, the silane-derived crosslinked structure may include a —Si—O—Si— crosslinking bond.

Next, the reactive extruded silane-grafted polyolefin composition is molded in the form of a sheet and oriented (S2).

For example, the reactive extruded silane-grafted polyolefin composition is extruded by using an extruder equipped with a T-die, or the like, and then cooled extrudate may be formed by using a general casting or calendaring process using water-cooling or air-cooling mode.

According to an embodiment of the present disclosure, it is possible to provide a separator having improved mechanical strength and puncture strength through the orientation step as mentioned above.

According to an embodiment of the present disclosure, the orientation may be carried out by sequential or simultaneous orientation using a roll or tenter. The orientation ratio may be 3 times or more, or 4-10 times, each in the machine direction and transverse direction. When the orientation ratio satisfies the above-defined ratio, it is possible to prevent the problem of insufficient orientation in one direction, a failure in balance of physical properties between the machine direction and the transverse direction, and degradation of tensile strength and puncture strength. When the total orientation ratio satisfies the above-defined range, it is possible to prevent the problems of non-orientation or a failure in pore formation.

According to an embodiment of the present disclosure, the orientation temperature may be varied with the melting point of polyolefin and concentration and type of the diluting agent.

According to an embodiment of the present disclosure, when the polyolefin is polyethylene and the diluting agent is liquid paraffin, the orientation temperature may be 70-160° C., 90-140° C., or 100-130° C. in the machine direction (MD), and may be 90-180° C., 110-160° C., or 120-150° C. in the transverse direction (TD).

When the orientation temperature satisfies the above-defined range, such a low temperature range of orientation temperature prevents the problem of breakage or non-orientation caused by the lack of softness. In addition, it is possible to prevent over-orientation or a difference in physical properties, caused by a high orientation temperature.

Then, the diluting agent is extracted from the molded and oriented sheet to obtain a porous membrane (S3).

According to an embodiment of the present disclosure, the diluting agent may be extracted from the porous membrane by using an organic solvent, and then the porous membrane may be dried.

According to an embodiment of the present disclosure, the organic solvent is not particularly limited, as long as it is capable of extraction of the diluting agents. However, it is suitable to use methyl ethyl ketone, methylene chloride or hexane having high extraction efficiency and showing a high drying rate.

According to an embodiment of the present disclosure, the extraction may be any conventional solvent extraction process, such as an immersion process, solvent spray process or ultrasonication process, and such processes may be used alone or in combination. After carrying out extraction, the content of residual diluting agents should be preferably 1 wt % or less. When the content of residual diluting agent is larger than 1 wt %, physical properties are degraded and permeability of the porous membrane is reduced. The content of residual diluting agent may be affected by extraction temperature and extraction time. To increase the solubility of diluting agents in the organic solvent, a higher extraction temperature is preferred. However, considering the safety problem caused by boiling of the organic solvent, the extraction temperature is preferably 40° C. or lower. When the extraction temperature equals to or is lower than the solidifying point of the diluting agent, extraction efficiency may be decreased significantly. Thus, the extraction temperature should be higher than the solidifying point of the diluting agents.

In addition, the extraction time may be varied with the thickness of a porous membrane. In the case of a separator having a thickness of 5-15 μm, the extraction time may be 2-4 minutes suitably.

Then, the porous membrane is thermally fixed (S4).

The thermal fixing is a process of fixing and heating the porous membrane so that the porous membrane to be shrunk may be fixed forcibly to remove residual stress.

According to an embodiment of the present disclosure, when the polyolefin is polyethylene, the thermal fixing temperature may be 100-230° C., 110-180° C., or 115-145° C. When the polyolefin is polyethylene and the thermal fixing temperature satisfies the above-defined range, polyolefin molecules may be rearranged to remove residual stress of the porous membrane, and the problem of pore blocking of the porous membrane caused by partial melting may be reduced.

When the non-grafted polyolefin having a high weight average molecular weight and silane-grafted polyolefin having a high weight average molecular weight are used at the same time according to the present disclosure, it can be seen that the absolute number of air permeation time is not significantly increased, despite an increase in thermal fixing temperature from 126° C. to 130° C., while ensuring low gel content and low heat shrinkage.

According to an embodiment of the present disclosure, the thermal fixing time may be 10-120 seconds, 20-90 seconds, or 30-60 seconds. When the thermal fixing is carried out for the above-defined range of time, polyolefin molecules may be rearranged to remove residual stress of the porous membrane, and the problem of pore blocking of the porous membrane caused by partial melting may be reduced.

After that, the thermally fixed porous membrane is crosslinked in the presence of water (S5).

According to an embodiment of the present disclosure, the crosslinking may be carried out at 60-100° C., 65-95° C., or 70-90° C.

According to an embodiment of the present disclosure, the crosslinking may be carried out under a humidity of 60-95% for 6-50 hours.

According to an embodiment of the present disclosure, after step (S5), the method may further include a step of applying and drying slurry for forming a porous coating layer including inorganic particles, a binder polymer and a solvent.

According to the present disclosure, the inorganic particles are not particularly limited, as long as they are electrochemically stable. In other words, the inorganic particles are not particularly limited, as long as they cause no oxidation and/or reduction in the operating voltage range (e.g. 0-5V based on $Li/Li^+$) of an applicable electrochemical device. Particularly, when using inorganic particles having a high dielectric constant, they contribute to an increase in dissociation degree of the electrolyte salt, particularly lithium salt, in a liquid electrolyte, and thus can improve ion conductivity of the electrolyte.

For these reasons, the inorganic particles may include high-dielectric constant inorganic particles having a dielectric constant of 5 or more, inorganic particles capable of transporting lithium ions and a mixture thereof.

The inorganic particles having a dielectric constant of 5 or more may include any one selected from the group consisting of $Al_2O_3$, $SiO_2$, $ZrO_2$, $AlOOH$, $TiO_2$, $BaTiO_3$, $Pb(Zr,Ti)O_3$ (PZT, wherein $0<x<1$), $Pb_{1-x}La_xZr_{1-y}Ti_yO_3$ (PLZT, wherein $0<x<1$, $0<y<1$), $(1-x)Pb(Mg_{1/2}Nb_{2/3})O_3PbTiO_3$ (PMN-PT, wherein $0<x<1$), hafnia ($HfO_2$), $SrTiO_3$, $SnO_2$, $CeO_2$, $MgO$, $NiO$, $CaO$, $ZnO$, $ZO_3$ and $SiC$, or a mixture of two or more of them.

The inorganic particles having lithium ion transportability may be any one selected from the group consisting of include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), ($LiAlTiP)_xO_y$-based glass ($1<x<4$, $0<y<13$), such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, 0<x<3, 0<y<2, 0<z<4) and $P_2S_5$-based glass ($Li_xP_yS_z$, 0<x<3, 0<y<3, 0<z<7), or a combination of two or more of them.

In addition, there is no particular limitation in the average particle diameter of the inorganic particles. However, the inorganic particles preferably have an average particle diameter of 0.001-10 μm in order to form a coating layer with a uniform thickness and to provide suitable porosity. When the inorganic particles have an average particle diameter less than 0.001 μm, they may show low dispersibility. When the inorganic particles have an average particle diameter larger than 10 μm, the resultant coating layer may have an increased thickness.

In the separator according to an embodiment of the present disclosure, the binder polymer used for forming the porous coating layer may be one used currently for forming a porous coating layer in the art. Particularly, a polymer having a glass transition temperature ($T_g$) of −200 to 200° C. may be used. This is because such a polymer can improve the mechanical properties, such as flexibility and elasticity, of the finally formed porous coating layer. Such a binder polymer functions as a binder which connects and stably fixes the inorganic particles with one another, and thus contributes to prevention of degradation of mechanical properties of a separator having a porous coating layer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0-100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than 45 $MPa^{1/2}$, it is difficult for the binder polymer to be swelled with a conventional liquid electrolyte for a battery.

Non-limiting examples of the binder polymer include but are not limited to: polyvinylidene fluoride-co-hexafluoropropylene, polyvinylidene fluoride-co-trichloro ethylene, polymethyl methacrylate, polyethyl acrylate, polybutyl acrylate, polymethyl methacrylate-co-ethylhexyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose.

The weight ratio of the inorganic particles to the binder polymer may be 90:10-99:1. When the weight ratio of the inorganic particles to the binder polymer satisfies the above-defined range, it is possible to solve the problem of a decrease in pore size and porosity of the resultant coating layer, caused by an increased content of binder polymer, and to solve the problem of degradation of peeling resistance of the resultant coating layer, caused by a decreased content of binder polymer.

Although there is no particular limitation in the thickness of the porous coating layer, the porous coating layer may have a thickness of 1-10 μm, particularly 1.5-6 μm. In addition, the porous coating layer preferably has a porosity of 35-65% but is not limited thereto.

The separator according to an embodiment of the present disclosure may further include other additives as ingredients of the porous coating layer, besides the inorganic particles and binder polymer.

In still another aspect of the present disclosure, there is provided a crosslinked polyolefin separator obtained by the above-described method.

The separator may be used for a lithium secondary battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLE 1

Including Non-Grafted Polyolefin and Silane-Grafted Polyolefin

First, 24 kg/hr of non-grafted high-density polyethylene (Korea Petrochemical Ind. Co. Ltd., VH035) having a weight average molecular weight of 300,000 and a melting point of 135° C. as non-grafted polyolefin, 24 kg/hr of silane-grafted polyethylene (Hyundai EP, X650) having a weight average molecular weight of 300,000 as silane-grafted polyolefin, and 112 kg/hr of liquid paraffin oil (Kukdong Oil & Chem. LP350F, 68 cSt) as a diluting agent were introduced to an extruder and mixed therein.

Herein, the weight ratio of the non-grafted polyethylene: silane-grafted polyethylene:diluting agent was 15:15:70. Meanwhile, 0.5 parts by weight of vinyltrimethoxysilane (as an alkoxysilane compound containing a carbon-carbon double bonded group) based on 100 parts by weight of the total weight of the non-grafted polyolefin, silane-grafted polyolefin and the diluting agent; 2 parts by weight of dibutyltin dilaurate (as a crosslinking catalyst) based on 100 parts by weight of the alkoxysilane compound containing a carbon-carbon double bonded group; and 2 parts by weight of 2,5-dimethyl-2,5-di(tert-butylperoxy)hexane (DHBP) (as an initiator) based on 100 parts by weight of the alkoxysilane compound containing a carbon-carbon double bonded group were further introduced to and mixed in the extruder.

Then, reactive extrusion was carried out at a temperature of 200° C. to obtain a silane-grafted polyethylene composition.

The resultant silane-grafted polyethylene composition was molded into a sheet-like shape through a T-die and cold casting roll. Then, biaxial orientation was carried out by using a tenter-type sequential orienting machine performing MD orientation and then TD orientation. The MD orientation ratio and the TD orientation ratio were 5.5 times and 5.0 times, respectively. The orientation temperature was 105° C. in MD and 125° C. in TD.

After that, the diluting agent was extracted from the oriented sheet by using methylene chloride, and the sheet was thermally fixed at 126° C. with an orientation ratio from 1.3 to 1.1 times to obtain a porous membrane. The porous membrane was crosslinked at 85° C. under a humidity condition of 85% for 48 hours to obtain a crosslinked polyethylene separator. The resultant crosslinked polyethylene separator had a thickness of 12 μm.

EXAMPLE 2

Including Non-Grafted Polyolefin and Silane-Grafted Polyolefin+SRS Coating Layer Slurry for forming a porous coating layer was applied to both surfaces of the crosslinked polyethylene separator obtained from Example 1. Herein, the slurry for forming a porous coating layer was prepared in such a manner that the weight ratio of alumina particles:cyanoethyl polyvinyl alcohol:polyvinylidene fluoride-co-hexafluoropropylene (PVDF-HFP):acetone might be 16.0:0.2:3.8:80. The slurry for forming a porous coating layer was coated on both surfaces of the crosslinked polyethylene separator under a humidity of about 65% to a thickness of 4.0 μm on each surface, and then dried at 60° C. The resultant composite membrane had a total thickness of 20.0 μm.

EXAMPLE 3

Controlling Silane Content

A separator was obtained in the same manner as Example 1, except that the composition introduced to the extruder was changed as shown in the following Table 1.

Particularly, 0.01 parts by weight of vinyltrimethoxysilane (as an alkoxysilane compound containing a carbon-carbon double bonded group) based on 100 parts by weight of the total weight of the non-grafted polyolefin, silane-grafted polyolefin and the diluting agent; 2 parts by weight of dibutyltin dilaurate (as a crosslinking catalyst) based on 100 parts by weight of the alkoxysilane compound containing a carbon-carbon double bonded group; and 2 parts by weight of 2,5-dimethyl-2,5-di(tert-butylperoxy)hexane (DHBP) (as an initiator) based on 100 parts by weight of the alkoxysilane compound containing a carbon-carbon double bonded group were further introduced to and mixed in the extruder.

EXAMPLE 4

Controlling Silane Content

A separator was obtained in the same manner as Example 1, except that the content of the alkoxysilane compound containing a carbon-carbon double bonded group introduced to the extruder was changed as shown in the following Table 1.

EXAMPLE 5

Introducing Phosphorus Compound

Example 5 further includes introducing a phosphorus compound containing a carbon-carbon double bonded group, as compared to Example 1.

First, 24 kg/hr of non-grafted high-density polyethylene (Korea Petrochemical Ind. Co. Ltd., VH035) having a weight average molecular weight of 300,000 and a melting point of 135° C. as non-grafted polyolefin, 24 kg/hr of silane-grafted polyethylene (Hyundai EP, X650) having a weight average molecular weight of 300,000 as silane-grafted polyolefin, and 112 kg/hr of liquid paraffin oil (Kukdong Oil & Chem. LP350F, 68 cSt) as a diluting agent were introduced to an extruder and mixed therein.

Herein, the weight ratio of the non-grafted polyethylene: silane-grafted polyethylene:diluting agent was 15:15:70. Meanwhile, 0.25 parts by weight of vinyltrimethoxysilane (as an alkoxysilane compound containing a carbon-carbon double bonded group) based on 100 parts by weight of the total weight of the non-grafted polyolefin, silane-grafted polyolefin and the diluting agent; 0.25 parts by weight of diphenylvinyl phosphine oxide (as a phosphorus compound containing a carbon-carbon double bonded group) based on 100 parts by weight of the total weight of the non-grafted polyolefin, silane-grafted polyolefin and the diluting agent; 2 parts by weight of dibutyltin dilaurate (as a crosslinking catalyst) based on 100 parts by weight of the total weight of the alkoxysilane compound containing a carbon-carbon double bonded group and the phosphorus compound containing a carbon-carbon double bonded group; and 2 parts by weight of 2,5-dimethyl-2,5-di(tert-butylperoxy)hexane (DHBP) (as an initiator) based on 100 parts by weight of the total weight of the alkoxysilane compound containing a carbon-carbon double bonded group and the phosphorus compound containing a carbon-carbon double bonded group were further introduced to and mixed in then extruder.

Then, reactive extrusion was carried out at a temperature of 200° C. to obtain a polyethylene composition to which the silane compound and phosphorus compound are grafted.

The resultant silane- and phosphorus compound-grafted polyethylene composition was molded into a sheet-like shape through a T-die and cold casting roll. Then, biaxial orientation was carried out by using a tenter-type sequential orienting machine performing MD orientation and then TD orientation. The MD orientation ratio and the TD orientation ratio were 7.0 times and 7.0 times, respectively. The orientation temperature was 110° C. in MD and 125° C. in TD.

After that, the diluting agent was extracted from the oriented sheet by using methylene chloride, and the sheet was thermally fixed at 126° C. with an orientation ratio from 1.3 to 1.1 times to obtain a porous membrane. The porous membrane was crosslinked at 85° C. under a humidity condition of 85% for 48 hours to obtain a crosslinked polyethylene separator. The resultant crosslinked polyethylene separator had a thickness of 12 μm.

COMPARATIVE EXAMPLE 1

Controlling Alkoxysilane Content

A separator was obtained in the same manner as Example 1, except that the content of the alkoxysilane compound containing a carbon-carbon double bonded group and that of the crosslinking catalyst introduced to the extruder were changed as shown in the following Table 1.

Particularly, 2.5 parts by weight of vinyltrimethoxysilane (as an alkoxysilane compound containing a carbon-carbon double bonded group) based on 100 parts by weight of the total weight of the non-grafted polyolefin, silane-grafted polyolefin and the diluting agent; 1 parts by weight of dibutyltin dilaurate (as a crosslinking catalyst) based on 100 parts by weight of the alkoxysilane compound containing a carbon-carbon double bonded group; and 2 parts by weight of 2,5-dimethyl-2,5-di(tert-butylperoxy)hexane (DHBP) (as an initiator) based on 100 parts by weight of the alkoxysilane compound containing a carbon-carbon double bonded group were further introduced to and mixed in the extruder.

COMPARATIVE EXAMPLE 2

Controlling Alkoxysilane Content

A separator was obtained in the same manner as Example 1, except the following.

First, 24 kg/hr of non-grafted high-density polyethylene (Korea Petrochemical Ind. Co. Ltd., VH035) having a weight average molecular weight of 300,000 and a melting point of 135° C. as non-grafted polyolefin, 24 kg/hr of silane-grafted polyethylene (Hyundai EP, X650) having a weight average molecular weight of 300,000 as silane-grafted polyolefin, and 112 kg/hr of liquid paraffin oil (Kukdong Oil & Chem. LP350F, 68 cSt) as a diluting agent were introduced to an extruder and mixed therein.

In addition, 3 parts by weight of vinyltrimethoxysilane (as an alkoxysilane compound containing a carbon-carbon double bonded group) based on 100 parts by weight of the total weight of the non-grafted polyolefin, silane-grafted polyolefin and the diluting agent; 1 parts by weight of dibutyltin dilaurate (as a crosslinking catalyst) based on 100 parts by weight of the alkoxysilane compound containing a carbon-carbon double bonded group; and 2 parts by weight of 2,5-dimethyl-2,5-di(tert-butylperoxy)hexane (DHBP) (as an initiator) based on 100 parts by weight of the alkoxysilane compound containing a carbon-carbon double bonded group were further introduced to and mixed in the extruder.

COMPARATIVE EXAMPLE 3

Using Low-Molecular Weight Non-Grafted Polyolefin Alone, Reactive Extrusion Temperature 180° C.

A separator was obtained in the same manner as Example 1, except the following.

Non-grafted polyolefin (LG Chem., XL1800) having a weight average molecular weight of 200,000 was used alone and introduced to the extruder, and reactive extrusion was carried out at a temperature of 180° C.

COMPARATIVE EXAMPLE 4

Using Low-Molecular Weight Non-Grafted Polyolefin Alone, Reactive Extrusion Temperature 200° C.

A separator was obtained in the same manner as Example 1, except the following.

Non-grafted polyolefin (LG Chem., XL1800) having a weight average molecular weight of 200,000 was used alone and introduced to the extruder, and reactive extrusion was carried out at a temperature of 200° C.

COMPARATIVE EXAMPLE 5

Using Low-Molecular Weight Silane-Grafted Polyolefin Alone, Reactive Extrusion Temperature 180° C.

A separator was obtained in the same manner as Example 1, except the following.

Silane-grafted polyolefin (Hyundai EP, X460) having a weight average molecular weight of 200,000 was used alone and introduced to the extruder, while not introducing any crosslinking additives. Then, reactive extrusion was carried out at a temperature of 180° C.

COMPARATIVE EXAMPLE 6

Using Low-Molecular Weight Silane-Grafted Polyolefin Alone, Reactive Extrusion Temperature 200° C.

A separator was obtained in the same manner as Example 1, except the following.

Silane-grafted polyolefin (Hyundai EP, X460) having a weight average molecular weight of 200,000 was used alone and introduced to the extruder, while not introducing any crosslinking additives. Then, reactive extrusion was carried out at a temperature of 200° C.

COMPARATIVE EXAMPLE 7

Reactive Extrusion Temperature 180° C.

A separator was obtained in the same manner as Example 1, except that the reactive extrusion temperature was controlled to 180° C.

COMPARATIVE EXAMPLE 8

Using Vinyl Group-Containing Phosphorus Compound Alone with No Vinyl Group-Containing Alkoxysilane A separator was obtained in the same manner as Example 1, except that a phosphorus compound containing a carbon-carbon double bonded group was used alone instead of the alkoxysilane compound containing a carbon-carbon double bonded group.

COMPARATIVE EXAMPLE 9

Using Phosphorus Compound Containing No Vinyl Group Alone with No Vinyl Group-Containing Alkoxysilane A crosslinked polyolefin separator was obtained in the same manner as Example 1, except that trimethyl phosphate, a phosphorus compound containing no vinyl group, was used alone instead of the alkoxysilane compound containing a carbon-carbon double bonded group.

TEST EXAMPLES

Each of the separators according to Examples and Comparative Examples was evaluated. The results are shown in the following Table 1.

TABLE 1

| | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|---|---|---|
| Content of alkoxysilane compound containing carbon-carbon double bonded group (parts by weight) (based on 100 parts by weight of total weight of non-grafted polyolefin, silane-grafted polyolefin and diluting agent) | 0.5 | 0.5 | 0.01 | 2 | 0.25 | 2.5 | 3.0 | 0.5 | 0.5 | — | — | 0.5 | — | — |
| Content of phosphorus compound containing carbon-carbon double bonded group (parts by weight) (based on 100 parts by weight of total weight of non-grafted contain polyolefin, silane-grafted polyolefin and diluting agent) | — | — | — | — | 0.25 | — | — | — | — | — | — | — | 0.5 | 0.5 parts by weight of phosphorus compound containing no vinyl group was used |
| Content of initiator (parts by weight) (based on 100 parts by weight of alkoxysilane compound containing carbon-carbon double bonded group) | 2 | 2 | 2 | 2 | 2 | 2 | 2 | 2 | 2 | — | — | 2 | 2 | 2 |
| Content of crosslinking catalyst (parts by weight) (based on 100 parts by weight of alkoxysilane compound containing carbon-carbon double bonded group) | 2 | 2 | 2 | 2 | 2 | 1 | 1 | 2 | 2 | — | — | 2 | 2 | 2 |

TABLE 1-continued

| | Ex. 1 | Ex. 2 | Ex. 3 | Ex. 4 | Ex. 5 | Comp Ex. 1 | Comp Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|---|---|---|
| Die-drool | No | No | No | No | No | Yes | Yes | Yes | Yes | No | No | Yes | Yes | No |
| Appearance of T-die sheet | Good | Good | Good | Good | Good | Poor | Poor | Poor | Poor | Poor | Poor | Poor | Poor | Good |
| Thermal fixing temperature (° C.) | 126 | 126 | 126 | 126 | 126 | 126 | 126 | 126 | 126 | 126 | 126 | 126 | 126 | 126 |
| Total thickness of separator (μm) | 12 | 20 | 12 | 12 | 12 | 12 | Separator was broken during secondary orientation | 12 | 12 | 12 | 12 | 12 | 12 | 12 |
| Thickness uniformity in width direction (300 mm) | ±0.5 | ±0.7 | ±0.5 | ±0.6 | ±0.5 | ±0.9 | | ±0.8 | ±0.8 | ±1.2 | ±1.2 | ±0.9 | ±1.0 | ±0.9 |
| Air permeation time (sec/100 cc) | 151 | 315 | 131 | 119 | 123 | 118 | | 126 | 128 | 131 | 132 | 130 | 138 | 133 |
| Meltdown temperature (° C.) | 190 | 198 | 174 | 188 | 185 | 190 | | 171 | 178 | 199 | 198 | 177 | 174 | 148 |
| Shutdown temperature (° C.) | 138 | 141 | 139 | 136 | 135 | 135 | | 139 | 139 | 136 | 136 | 139 | 135 | 140 |
| Heat shrinkage (150° C./30 min) MD | 66 | 48 | 68 | 64 | 60 | 60 | | 64 | 65 | 64 | 65 | 63 | 66 | 65 |
| Heat shrinkage (150° C./30 min) TD | 62 | 39 | 64 | 61 | 58 | 59 | | 62 | 62 | 62 | 62 | 60 | 61 | 63 |
| Gel content (%) | 60.1 | 23.4 | 12.9 | 85.3 | 75.1 | 88.6 | 54.1 | 58.6 | 77.9 | 90.1 | 91.3 | 31.3 | 45.2 | 0 |
| Reactive extrusion temperature (° C.) | 200 | 200 | 200 | 200 | 200 | 200 | 200 | 180 | 200 | 180 | 200 | 180 | 200 | 200 |

As shown in Table 1, in the case of Examples 1-5, since the content of alkoxy group-containing vinylsilane is significantly low and non-grafted polyolefin and silane-grafted polyolefin having a controlled weight average molecular weight are used at the same time, no die-drool phenomenon occurs even when the reactive temperature is increased to 200° C., and the separators retain thickness uniformity in the width direction.

On the contrary, when the content of alkoxy group-containing vinylsilane is increased in the case of Comparative Example 1 or 2, die-drooling occurs and the sheet appearance is poor. In addition, in the case of Comparative Example 1, the gel content in the extruder is increased significantly. Meanwhile, in the case of Comparative Example 2, the separator is broken during the secondary orientation.

Then, Comparative Examples 3-6 in Table 1 will be compared with one another.

First, in terms of a degree of die-drool generation, die-drool generation becomes severe in the order of Comparative Example 4 (reactive extrusion of low-molecular weight non-grafted polyolefin alone at 200° C.)>Comparative Example 3 (reactive extrusion of low-molecular weight non-grafted polyolefin alone at 180° C.)>Comparative Example 6 (reactive extrusion of low-molecular weight silane-grafted polyolefin alone at 200° C.)>Comparative Example 5 (reactive extrusion of low-molecular weight silane-grafted polyolefin alone at 180° C.). In the case of non-grafted polyolefin, it is thought that die-drool generation is more severe, since vinylsilane monomer does not react with polyolefin but may be evaporated by itself with high possibility. Such a die-drool phenomenon is increased, as the reactive extrusion temperature is increased. Meanwhile, when using non-grafted polyolefin, which has a lower molecular weight as compared to an embodiment of the present disclosure, alone (Comparative Examples 3 and 4), the low-molecular weight non-grafted polyolefin has low viscosity and shows higher volatility after silane grafting, and thus causes more die-drool generation.

Next, in terms of the appearance of a T-die sheet, the sheet appearance becomes poor in the order of Comparative Example 3 (reactive extrusion of non-grafted polyolefin alone at 180° C.)>Comparative Example 5 (reactive extrusion of silane-grafted polyolefin alone at 180° C.)>Comparative Example 7 (the same as Example 1, except that reactive extrusion is carried out at 180° C.)>Comparative Example 4 (reactive extrusion of non-grafted polyolefin alone at 200° C.)>Comparative Example 6 (reactive extrusion of silane-grafted polyolefin alone at 200° C.).

Particularly, in the case of reactive extrusion carried out at 180° C. under the conditions of an extrusion amount of 150 kg/hr or more and a retention time in the extruder of 5 minutes of less (Comparative Example 3), it is more difficult to prepare a homogeneous polyethylene solution as compared to reactive extrusion carried out at 200° C. (Comparative Example 4). Therefore, it seems that the compatibility of polyolefin, the diluting agent and crosslinking additives (alkoxy group-containing vinylsilane, initiator, crosslinking catalyst, etc.) is degraded.

In addition, in the case of grafted polyolefin, it is more likely that the polyolefin is crosslinked in the extruder to cause an increase in viscosity. Thus, reactive extrusion carried out at 180° C. (Comparative Example 5) is relatively disadvantageous as compared to reactive extrusion carried out at 200° C. (Comparative Example 6). Meanwhile, when viscosity is increased, drooling at a T-die, or the like, is relatively decreased, but thickness uniformity in the width direction is degraded as compared to Examples.

Meanwhile, in the case of Comparative Examples 5 and 6, silane-grafted polyolefin is used and evaporation of unreacted silane is less likely, and thus a relatively high grafting conversion ratio is provided. Therefore, it is thought that gel content in the case of Comparative Examples 5 and 6 is higher as compared to the embodiments in which non-grafted polyolefin is used (i.e. Comparative Examples 3 and 4).

Meanwhile, Example 5 includes further introducing a phosphorus compound containing a carbon-carbon double bonded group together with a silane compound. On the contrary, Comparative Examples 8 and 9 use a phosphorus compound alone. Each of Comparative Examples 8 and 9 shows a meltdown temperature of 174° C. and 148° C., respectively, and thus has lower safety as compared to Examples. On the contrary, Example 5 shows a lower shutdown temperature as compared to the other Examples and maintains a relatively higher meltdown temperature, thereby providing significantly improved safety.

In Table 1, each evaluation item is determined by the following methods.

1) Method of Observing Die-Drool Phenomenon

It is judged that a die-drool phenomenon occurs, when 3 or more foreign materials having a diameter of 1.0 mm or more are detected in a T-die after extrusion is carried out by the method for manufacturing a crosslinked polyolefin separator according to each of Examples and Comparative Examples.

2) Method for Determining Thickness of Separator

The thickness of a separator was determined by using a thickness measuring system (VL-50S-B available from Mitutoyo Co.).

3) Method for Determining Air Permeability

Air permeability was determined by using a Gurley type air permeability tester according to JIS P-8117. Herein, the time required for 100 mL of air to pass through a diameter of 28.6 mm and an area of 645 mm² was measured.

4) Method for Evaluating T-Die Sheet Appearance and Thickness Uniformity in Width Direction (300 mm)

The appearance and thickness profile of a casting sheet ejected from a T-die were evaluated by using a radiation gauge (Eurotherm Gauging System Inc./ASC-190), when the sheet passed through the casting roll in the T-die.

5) Method for Determining Heat Shrinkage

Heat shrinkage was calculated by the formula of (Initial length−Length after carrying out heat shrinking treatment at 120° C. for 1 hour)/(Initial length)×100

6) Method for Determining Gel Content in Separator

A sheet was obtained right after it was ejected from an extruder T-die, was allowed to stand for 7 days or more, and then liquid paraffin oil contained in the sheet was extracted with methylene chloride. The sheet from which liquid paraffin oil was removed was dipped in 1,2,4-trichlorobenezene solution and heated at 160° C. for 12 hours, and then the dry weight of residue was measured. The dry weight of residue was converted into percentage (%) based on the initial weight.

7) Method for Determining Shutdown Temperature

First, each of the separators according to Examples and Comparative Examples was introduced to an electrolyte (1M $LiPF_6$ in ethylene carbonate:ethylmethyl carbonate=5:5).

Then, the shutdown temperature was defined by the point where ion conductivity becomes 0, while increasing the temperature from 30° C. at a rate of 5° C./min, and the temperature at this point was measured.

8) Method for Determining Meltdown Temperature

The meltdown temperature is determined by taking a sample each in the machine direction (MD) and the transverse direction (TD) perpendicular to MD and analyzing the same through thermomechanical analysis (TMA). Particularly, a sample having a length of 10 mm is introduced to a TMA instrument (TA instrument, Q400) and exposed to an increasing temperature condition (heating rate 5° C./min. from 30° C.), while applying a tension of 19.6 mN thereto. As the temperature is increased, the sample undergoes a change in length, and the temperature at which point the sample length is increased rapidly to cause fracture is measured. The temperature is measured each in MD and TD, and the higher temperature is defined as the meltdown temperature of the corresponding sample.

What is claimed is:

1. A method for manufacturing a crosslinked polyolefin separator, comprising:
   (S1) mixing non-grafted polyolefin having a weight average molecular weight of 300,000 or more, silane-grafted polyolefin having a weight average molecular weight of 300,000 or more, a diluting agent, an initiator, an alkoxysilane compound containing a carbon-carbon double bonded group and a crosslinking catalyst to an extruder and then carrying out reactive extrusion at 200° C. or higher to obtain a silane-grafted polyolefin composition;
   (S2) molding and orienting the reactive extruded silane-grafted polyolefin composition in the form of a sheet;
   (S3) extracting the diluting agent from the oriented sheet to obtain a porous membrane;
   (S4) thermally fixing the porous membrane; and
   (S5) crosslinking the porous membrane in the presence of water,
   wherein a content of the alkoxysilane compound containing the carbon-carbon double bonded group is 0.01-2 parts by weight based on 100 parts by weight of a total weight of the non-grafted polyolefin, silane-grafted polyolefin and the diluting agent.

2. The method for manufacturing the crosslinked polyolefin separator according to claim 1, wherein a weight ratio of the non-grafted polyolefin to the silane-grafted polyolefin is 90:10-20:80.

3. The method for manufacturing the crosslinked polyolefin separator according to claim 1, wherein the non-grafted polyolefin has a weight average molecular weight of 300,000-1,500,000.

4. The method for manufacturing the crosslinked polyolefin separator according to claim 1, wherein the silane-grafted polyolefin has a weight average molecular weight of 300,000-1,000,000.

5. The method for manufacturing the crosslinked polyolefin separator according to claim 1, wherein the reactive extrusion is carried out at a temperature of 200-250° C.

6. The method for manufacturing the crosslinked polyolefin separator according to claim 1, wherein the alkoxysilane compound containing the carbon-carbon double bonded group includes vinyltrimethoxysilane, vinyltriethoxysilane, vinyltriacetoxysilane, (3-methacryloxypropyl)trimethoxysilane, (3-methacryloxypropyl) triethoxysilane, vinylmethyl dimethoxysilane, vinyl-tris(2-methoxyethoxy)silane, vinylmethyldiethoxysilane or a mixture of at least two thereof.

7. The method for manufacturing the crosslinked polyolefin separator according to claim 1, wherein a content of the alkoxysilane compound containing the carbon-carbon double bonded group is 0.05-1.2 parts by weight based on 100 parts by weight of the total weight of the non-grafted polyolefin, silane-grafted polyolefin and the diluting agent.

8. The method for manufacturing the crosslinked polyolefin separator according to claim 1, wherein the non-grafted polyolefin has a weight average molecular weight of 300,000-1,000,000,
the silane-grafted polyolefin has a weight average molecular weight of 300,000-1,000,000,
a weight ratio of the non-grafted polyolefin to the silane-grafted polyolefin is 90:10-50:50,
the reactive extrusion is carried out at a temperature of 200-230° C., and
a content of the alkoxysilane compound containing the carbon-carbon double bonded group is 0.1-0.5 parts by weight based on 100 parts by weight of the total weight of the non-grafted polyolefin, silane-grafted polyolefin and the diluting agent.

9. The method for manufacturing the crosslinked polyolefin separator according to claim 1, wherein the thermal fixing is carried out at a temperature of 100-230° C.

10. The method for manufacturing the crosslinked polyolefin separator according to claim 1, further comprising applying and drying slurry for forming a porous coating layer including inorganic particles, a binder polymer and a solvent, after (S5).

11. The method for manufacturing the crosslinked polyolefin separator according to claim 1, wherein a phosphorus compound containing a carbon-carbon double bonded group is further introduced to the extruder in (S1).

12. The method for manufacturing the crosslinked polyolefin separator according to claim 11, wherein (S1) comprises mixing the non-grafted polyolefin having a weight average molecular weight of 300,000 or more, the silane-grafted polyolefin having a weight average molecular weight of 300,000 or more, the diluting agent, the initiator, alkoxy group-containing vinylsilane, the phosphorus compound containing the carbon-carbon double bonded group and a crosslinking catalyst to the extruder, and then carrying out reactive extrusion at 200° C. or higher to obtain the polyolefin composition having the silane compound and the phosphorus compound grafted to a backbone of polyolefin.

13. The method for manufacturing the crosslinked polyolefin separator according to claim 11, wherein the phosphorus compound containing the carbon-carbon double bonded group includes diphenylvinylphosphine oxide, diphenylvinylphosphine, dimethyl vinyl phosphonate, diethyl vinyl phosphonate, diphenylvinyl phosphate, dimethylvinyl phosphate, diethylvinyl phosphate, ethenyl dihydrogen phosphate, isopropenyl dihydrogen phosphate, vinylphosphonic acid or a mixture of at least two thereof.

14. The method for manufacturing the crosslinked polyolefin separator according to claim 11, wherein a total content of the alkoxysilane compound containing the carbon-carbon double bonded group and the phosphorus compound containing the carbon-carbon double bonded group is 0.01-2 parts by weight based on 100 parts by weight of the total weight of the non-grafted polyolefin, silane-grafted polyolefin and the diluting agent.

15. The method for manufacturing the crosslinked polyolefin separator according to claim 11, wherein a weight ratio of the alkoxysilane compound containing the carbon-carbon double bonded group to the phosphorus compound containing the carbon-carbon double bonded group is 90:10-30:70.

16. The method for manufacturing the crosslinked polyolefin separator according to claim 11, wherein the separator has a shutdown temperature of 135° C. or lower and a meltdown temperature of 185° C. or higher.

17. The method for manufacturing the crosslinked polyolefin separator according to claim 11, wherein the separator has a temperature difference of 30° C. or higher between the shutdown temperature and meltdown temperature.

18. A crosslinked polyolefin separator obtained by the method as defined in claim 11, wherein the separator comprises a silane compound and a phosphorus compound grafted to a backbone of polyolefin, and has a silane-derived crosslinking structure.

19. A crosslinked polyolefin separator obtained by the method as defined in claim 1.

* * * * *